VOLTAGE-RESPONSIVE SEQUENCING SWITCH

Filed Dec. 14, 1964

INVENTOR.
JAMES R. ALBURGER
BY [signature]
ATTORNEY

United States Patent Office 3,335,292

Patented Aug. 8, 1967

3,335,292

VOLTAGE-RESPONSIVE SEQUENCING SWITCH

James R. Alburger, 5007 Hillard Ave., La Canada, Calif. 91011

Filed Dec. 14, 1964, Ser. No. 418,063
5 Claims. (Cl. 307—88.5)

This invention relates to an electronic switching circuit system which is sensitive to predetermined signal voltages, and particularly to an electronic circuit which has a capability for multiple switching of a plurality of electrical contact points in any preprogrammed sequence.

There are a wide variety of applications for an electronic sequencing switch. One common application is in telemetry of data from a remote location, as in airborne instruments, to a central recording or readout station. In such applications, a plurality of measuring instruments may be set up at the remote location in such a way that their various outputs are in the form of various signal voltages. These instrument signal voltages may be sampled in sequence by an electrical commutator arrangement, and the sampled voltages may be combined sequentially in a common circuit, such as a transmission line or radio carrier, and may be transmitted to a recording and readout station.

In the past, an electrical sequence switching operation has been acomplished by means of a mechanically rotating electrical commutator. This electromechanical method of sequence switching has many drawbacks, as for example the difficulty of maintaining accurate rotational speeds, electrical noise in the commutator, and the relatively large bulk and weight of the equipment. Another previously employed method of electronic sequence switching employs a so-called digital tree network. A digital tree consists of a plurality of flip-flop switch networks, or so-called bistable circuits, arranged in the form of a branching array of networks which has the appearance of a tree. This well known switching method if cumbersome and very difficult to control properly.

The sequence switching method and means of the present invention avoids the cumbersome electronic control circuitry of digital tree methods, and provides easily adjustable circuits which are compact and light in weight.

In addition to being useful as an electronic sequence switch, the device and method of this invention has a variety of other uses. For example, the circuit may be used to sense voltage levels, either DC or instantaneous values in an AC wave form. Another use is in the programming of switching operations, where sequences of switching operations must be established in preplanned orders, and then perhaps altered quickly at the will of an operator.

The principal object of the invention, therefore, is to provide an electronic sequence switching circuit which is relatively simple and low in cost.

Another object of the invention is to provide an electronic circuit capable of sensing voltage levels.

A further object of the invention is to provide a method of and means for programming a series of control operations.

A better understanding of this invention may be had from the following detailed description when read in conjunction with the accompanying drawings, in which.

Figure 1:
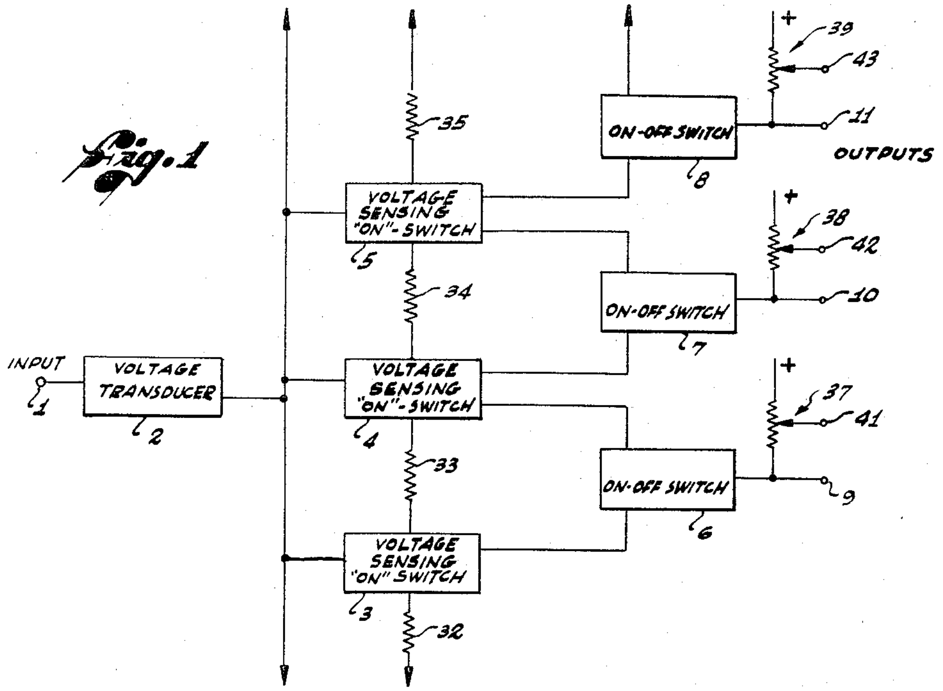
FIG. 1 is a block diagram showing the essential circuit elements embodied in the invention.

Referring, now, to the drawings in which the same numeral identifies the same element and particularly to FIG. 1, input information enters the circuit at terminal 1. This input information is then converted to a voltage by means of a voltage transducer 2. As the input information changes, the voltage output from the voltage transducer changes. The output level of this voltage transducer is adjusted so as to properly electrically match the circuit elements to which it is connected.

The voltage output from the transducer 2 is applied to a set of voltage sensing "on" switches 3, 4, and 5. These switches are normally off and are biased by a series of resistors 32, 33, 34, and 35 in such a way that they will respond sequentially to an increasingly greater input voltage. Thus, as the applied voltage from transducer 2 increases slightly from zero, the switch 3 will turn on first. As the applied voltage is still further increased, switch 4 will turn on, and a further increase in the applied voltage will cause switch 5 to turn on. At this condition of applied voltage, all three switches 3, 4, and 5 are in the "on" condition. These sensing switches may be of the type shown in FIG. 2.

The outputs of the voltage sensing "on" switches 3, 4, and 5 are connected to a set of floating "on-off" switches 6, 7, and 8 in the following manner. The floating switches are biased in such a manner that they are normally "off." When switch 3 turn on, it causes a shift in the bias condition of floating switch 6 so that this switch turns on. When switch 4 turns on, it causes an opposite shift in the bias condition of the floating switch 6 so that the switch 6 now turns off. Simultaneously, the turn-on action of switch 4 causes a shift in the bias condition of switch 7 so that it turns on.

In a like manner, when switch 5 turns on, it causes switch 7 to turn off and switch 8 to turn on. This sequence of switching operations may be extended to any desired number of switch elements, limited only by the available control voltage and the capabilities of the circuit elements, such as transistors or tubes, to operate within a given voltage range. These floating switches may be of the type shown in FIG. 2.

The output terminals 9, 10, and 11 of the switching network of FIG. 1 may be connected and used in many ways in a manner similar to any commutator-type switch terminals. For example, different reactive elements may be connected to the terminals so that the different values of reactance may be switched into a circuit such as an oscillator or a filter network. Resistors of different values may be connected to the terminals in such a way that they may be switched into the circuit, thus providing a controllable variation of resistance. The switch terminals 9, 10, and 11 may also be connected so that an adjustable output voltage is obtained as shown by potentiometers 37, 38, and 39 and terminals 41, 42, and 43, and the various voltages may then be sequentially switched, depending on the applied voltage from the transducer 2.

The input information to the transducer 2 may be in the form of signal voltages, in which case the circuit becomes a voltage sensing network. The input information may be in the form of a repetitive voltage wave form, such as a saw-tooth wave, in which case the circuit becomes a commutator-type sequencing switch. The many different ways in which this switching network can be used are for the most part well known and understood by those skilled in the art, and such applications are not germane to the invention.

The various circuit functions of this invention may be implemented by either vacuum tube electronic circuitry or by solid-state circuitry. In the case of solid-state circuitry, either NPN or PNP transistors may be used as desired, it being only necessary to reverse electrical polarities and adjust appropriate circuit constants. For the sake of simplicity in describing the various essential circuits, a solid-state device utilizing NPN silicon transistors will be used as an example, it being understood that equivalent circuits may be constructed by using vacuum tubes, magnetic amplifiers, or even tunnel diode type amplifiers.

Figures 2, 3:
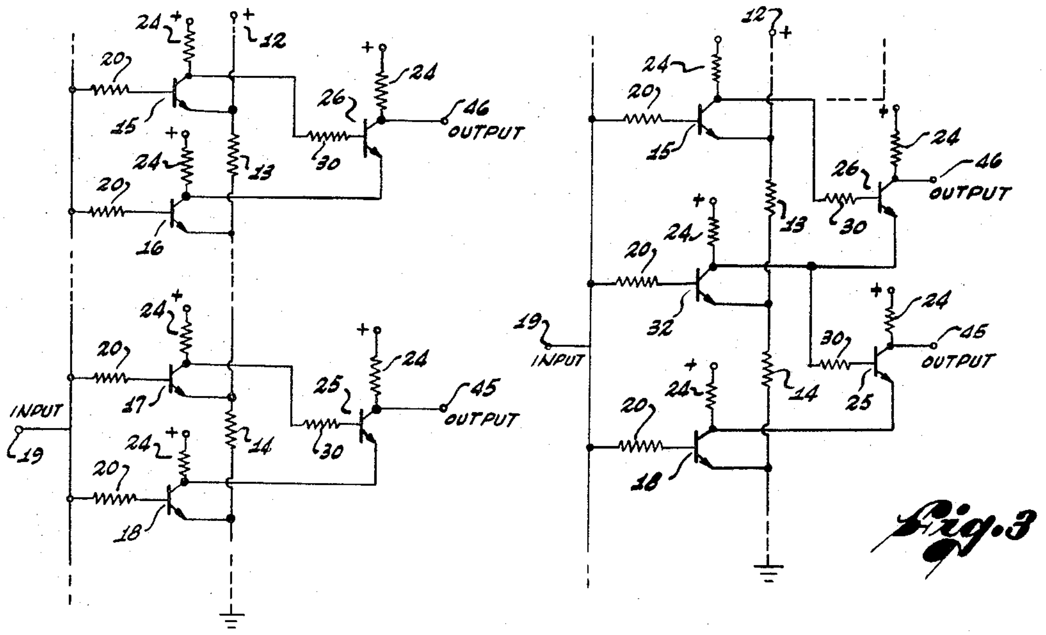
FIG. 2 is a schematic diagram of a pair of elemental solid-state switching networks which may be used in the invention.
FIG. 3 is a schematic diagram of a simplified solid-state network which may be employed in the invention.

The action of the switch circuits of the invention may be understood by referring to FIG. 2. In this figure, two voltage sensing network sets are illustrated, these sets being but two in an iterative network, the dotted lines indicating connections between a plurality of network sets.

A positive voltage is applied at terminal 12 so that a small voltage drop is produced across each of the bias resistors 13 and 14 or other resistors in this bias circuit. These voltage drops provide a reference voltage difference between the emitters of transistors 15 and 16, and between transistors 17 and 18. Now, when an input voltage is applied to the several transistors 15, 16, 17, and 18 from input terminal 19 through ballast resistors 20, such that the bases of the transistors become forward biased by a rising positive voltage, a point is reached where a base-to-emitter current begins to flow in the transistor 18 thus causing this transistor switch to turn on. As the input voltage continues to rise, another point is reached at which the transistor 17 also turns on, and so on. In the circuit arrangement of FIG. 2, transistors 16 and 17 have the same emitter bias condition and, therefore, they will turn on simultaneously responsive to an appropriate input voltage.

Prior to the turn-on condition in the transistors, the voltages which appear on their respective collectors are about equal to the supply voltage, since there are no voltage drops in the collector load resistances 24. When transistor 18 switches on due to the rising input voltage, its collector voltage suddenly drops to a value near that of its emitter potential, and this voltage change is transmitted to the emitter of transistor 25. Inasmuch as the collector voltage of the transistor 17 is still about equal to the supply voltage, a base-to-emitter current begins to flow in transistor 25 causing it to switch on.

As the input voltage rises still further, transistor 17 switches on, allowing its collector voltage to drop to a value about equal to its emitter potential, and this voltage change is transmitted to the base of transistor 25 causing it to switch off. Concurrently with the switch-off action of transistor 25, transistor 26 switches on responsive to a switch-on effect which occurs in transistor 16. A still further increase in the input voltage from 19 will cause transistor 26 to switch off responsive to a switch-on effect occurring in transistor 15.

Most transistors require a base-emitter voltage of at least .6 of a volt before a switch-on will occur, hence when both transistors 17 and 18 are in the same condition, switch-on or switch-off as the case may be, the base-emitter voltage on transistor 25 is less than .6 of a volt and it is switched off. The circuit of transistor 25 is known as a "floating switch" configuration, since the voltages on the circuit elements are not tied to a reference ground potential.

The outputs of transistors 25 and 26 are taken from their collectors at terminals 45 and 46, the voltages of these terminals being close to the supply voltage when the transistors are switched off, and close to ground potential when the transistors are switched on. Thus, the output of transistor 25, for example, exhibits a switch-on and switch-off performance in sequence as the input voltage rises across the reference voltage differential across the resistor 14.

The circuit constants which may be employed in the network illustrated in FIG. 2 may be varied over a wide range of values. For example, a practical value for the voltage drop across resistor 14 is .3 of a volt, although this may be varied over a range of values depending on the switching sensitivity of the voltage sensing switch-on transistors. In many transistors, switching may be made to occur with a change in applied base-emitter voltage amounting to as little as .05 of a volt.

The resistors 20 in the base legs of transistors 15, 16, 17, and 18 act as ballast resistors to limit the load on the input signal voltage, and may have values on the order of 10,000 ohms. The resistors 30 in the base legs of transistors 25 and 26 act as ballast resistors to limit the current flowing in the base-emitter circuits of these transistors, and may have values on the order of 1 megohm. The load resistors 24 in the collector legs of the transistors may be on the order of 100,000 ohms. The bias resistors 13 and 14 should have low resistance values on the order of 10 ohms. These values are preferred for typical silicon transistors.

Referring, now, to FIG. 3, it will be seen that this circuit is closely similar to that of FIG. 2. In fact, it is almost identical with the circuit of FIG. 2 except that the functions of transistors 16 and 17 in FIG. 2 are combined in a single transistor 32. All other circuit elements in FIG. 3 are identical with those in FIG. 2.

A large number of switch points may be assembled into a circuit of the type described, the number being limited only by the supply voltage and the switching sensitivity of the control transistors. For example, with a supply voltage of about 22 volts and a switch sensitivity of .1 of a volt, as many as 200 switch points or gates may be operated independently.

Certain refinements may be included in the circuitry described herein, such as the addition of diodes which act to eliminate the current saturation of the switching control transistors, or peaking resonant circuits may be included to improve transient response characteristics in the switching operation. Such methods are well known to the art, and are useful although not essential to the basic concept and practice of this invention.

I claim:

1. An electrical switching circuit comprising an input connected through ballast resistors to the bases of a series of at least two transistors having their emitters selectively connected to forward bias voltages in ascending voltage magnitudes, and having their collectors connected through ballast resistors to a source of supply voltage, and at least one output transistor selectively connected between pairs of transistors of the said series, the emitter of said at least one output transistor being connected to a collector of a transistor of the said series, and the base of said at least one output transistor being connected through a ballast resistor to the collector of a transistor of the said series having a higher forward bias.

2. An all-electrical switching commutator comprising an input connected through ballast resistors to the bases of a first series of at least three transistors having their emitter selectively connected to forward bias voltages in ascending voltage magnitudes, and having their collectors connected through ballast resistors to a source of supply voltage, and a second series of at least two output transistors selectively connected between pairs of transistors of the said first series, the emitter of each transistor in said second series being connected to a collector of a transistor of the said first series, and the base of said each transistor in said second series being connected through a ballast resistor to the collector of a transistor of the said first series having a higher forward bias, said second series of at least two output transistors being normally off but adapted to be selectively turned on and off with variations in voltage level applied to said input.

3. An electrical switching circuit in accordance with claim 1 in which the transistors utilized are NPN transistors.

4. An electrical switching system in accordance with claim 1 in which means are connected to the output of said at least one output transistor for predetermining the level of the output voltages thereof.

5. An all electrical switching commutator in accordance with claim 2 in which a saw-tooth voltage wave form is applied to said input to provide series actuation of said output transistors.

References Cited

UNITED STATES PATENTS

| | | | |
|---|---|---|---|
| 2,541,039 | 2/1951 | Cole | 328—116 |
| 2,817,771 | 12/1957 | Barnothy | 307—88.5 |
| 3,041,469 | 6/1962 | Ross | 307—88.5 |
| 3,114,057 | 12/1963 | Caruso | 307—88.5 |
| 3,167,757 | 1/1965 | D'Aquila | 307—88.5-7.1 |
| 3,196,283 | 7/1965 | Flattau | 307—88.5 |

ARTHUR GAUSS, *Primary Examiner.*

R. H. EPSTEIN, I. C. EDELL, *Assistant Examiners.*